US011673359B2

(12) United States Patent
Stong

(10) Patent No.: US 11,673,359 B2
(45) Date of Patent: Jun. 13, 2023

(54) SECUREMENT DEVICE FOR A PRESS TOOL

(71) Applicant: James Stong, Royersford, PA (US)

(72) Inventor: James Stong, Royersford, PA (US)

( * ) Notice: Subject to any disclaimer, the term of this patent is extended or adjusted under 35 U.S.C. 154(b) by 680 days.

(21) Appl. No.: 16/739,528

(22) Filed: Jan. 10, 2020

(65) Prior Publication Data
US 2020/0238650 A1    Jul. 30, 2020

Related U.S. Application Data

(60) Provisional application No. 62/797,695, filed on Jan. 28, 2019.

(51) Int. Cl.
*B23B 31/16* (2006.01)
*B30B 15/02* (2006.01)
*B23Q 3/04* (2006.01)

(52) U.S. Cl.
CPC .............. *B30B 15/02* (2013.01); *B23Q 3/04* (2013.01); *B23B 31/16* (2013.01); *B23B 31/16279* (2013.01); *Y10T 279/19* (2015.01); *Y10T 279/1986* (2015.01)

(58) Field of Classification Search
CPC ............ Y10T 279/19; Y10T 279/1986; B23B 31/16279; B23B 31/16275; F16L 37/091
USPC ................................. 279/110, 123, 124, 140
See application file for complete search history.

(56) References Cited

U.S. PATENT DOCUMENTS

| | | | | |
|---|---|---|---|---|
| 2,726,092 | A * | 12/1955 | Daniels | B23B 31/16275 279/110 |
| 3,104,474 | A * | 9/1963 | Rehart | B23B 31/102 279/154 |
| 3,322,434 | A * | 5/1967 | Barnes | B23B 31/16275 279/123 |
| 4,143,569 | A | 3/1979 | Marconi | |
| 4,561,663 | A * | 12/1985 | Ferraro | B23B 31/16295 279/123 |
| 4,960,285 | A * | 10/1990 | Doi | B23B 31/16275 279/123 |
| 5,904,064 | A | 5/1999 | Higuchi | |
| 5,921,534 | A | 7/1999 | Swann et al. | |
| 6,478,311 | B1 * | 11/2002 | Hinson | B23B 31/16275 279/154 |
| 6,764,218 | B2 | 7/2004 | Kanamaru et al. | |
| 2008/0295567 | A1 | 12/2008 | Thielges et al. | |
| 2012/0061926 | A1 * | 3/2012 | Allis | B25B 1/24 279/123 |
| 2014/0167369 | A1 * | 6/2014 | Zeng | B23Q 3/12 279/140 |

* cited by examiner

*Primary Examiner* — Mahdi H Nejad
(74) *Attorney, Agent, or Firm* — Boudwin Intellectual Property; Daniel Boudwin

(57) ABSTRACT

A securement device for a press tool including an angular exterior body having a side wall. A multitude of ratcheting bodies are located around a top edge of the exterior body. The ratchets include a ratchet bar. The ratchet bar has a plurality of ratchet grooves that allow the ratchet bars to be slide inward toward the interior of the exterior body and to be locked into place. An interior body is located within the exterior body such that it can be moved about and provide extra support for the ratchets.

16 Claims, 5 Drawing Sheets

SECUREMENT DEVICE FOR A PRESS TOOL

CROSS REFERENCE TO RELATED APPLICATIONS

This application claims the benefit of U.S. Provisional Application No. 62/797,695 filed on Jan. 28, 2019. The above identified patent application is herein incorporated by reference in its entirety to provide continuity of disclosure.

BACKGROUND OF THE INVENTION

The present invention relates to a securement device for a press tool. More particularly, the present invention provides an exterior body with a plurality of ratchets located thereabout that will support an item to be pressed.

Press tools serve all sorts of purposes and are required tools in many activities. Presses are staple tools in machine shops and mechanic shops for example. While it is a necessary tool, it is difficult to use. A traditional press requires the need to have spacers placed around the item to be pressed. These spacers are cylindrical tubes that are not adjustable.

Since the tubes are not adjustable many different tubes are required to ensure that the proper tube is in the shop when it is needed. Further, using these tubes can require more than one person to operate the device. This can be a time consuming and dangerous process. Further, having all of these different spacers in a shop can cause a clutter and an even more dangerous pressing environment.

Consequently, there is a need in for an improvement in the art of properly securing an item to be pressed in a pressing tool. The present invention substantially diverges in design elements from the known art while at the same time solves a problem many people face when using a pressing tool. In this regard the present invention substantially fulfills these needs.

SUMMARY OF THE INVENTION

The present invention provides a securement device for a press tool wherein the same can be utilized for providing convenience for the user when using a pressing tool. The securement device for a press tool comprises an exterior body having at least one sidewall. There is an opening at the top and bottom of the exterior body. A plurality of ratcheting bodies is disposed around a top side of the sidewall. The ratcheting bodies are placed on a plane perpendicular to the plane of the sidewall. An interior body, having at least one sidewall, is movably disposed within the exterior body, wherein the interior body allows the ratcheting bodies to rest about the top edge of the interior body.

Another object of the securement device is to provide an angular exterior body.

Another object of the securement device is to provide release handles attached to the ratcheting bodies.

Another object of the securement device is to have the ratcheting bodies comprise a ratchet bar. The ratchet bar is further configured to slide forward toward the middle of the exterior body and be locking into place by the ratcheting body.

Another object of the securement device is to have a support bar located below the ratchet bar.

Another object of the securement device is to have the ratchet bar has a first end and a second end. The ratchet bar has a plurality of ratchet grooves placed on the bar between the first and the second end.

Another object of the securement device is to provide a ratchet bar that tapers toward one end.

Another object of the securement device is to have the ratchet bar configured to be placed within and properly function no matter which end is placed within the ratcheting body.

Another object of the securement device is to have grooves placed in the top edge of the interior body that correspond with the ratcheting bodies.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
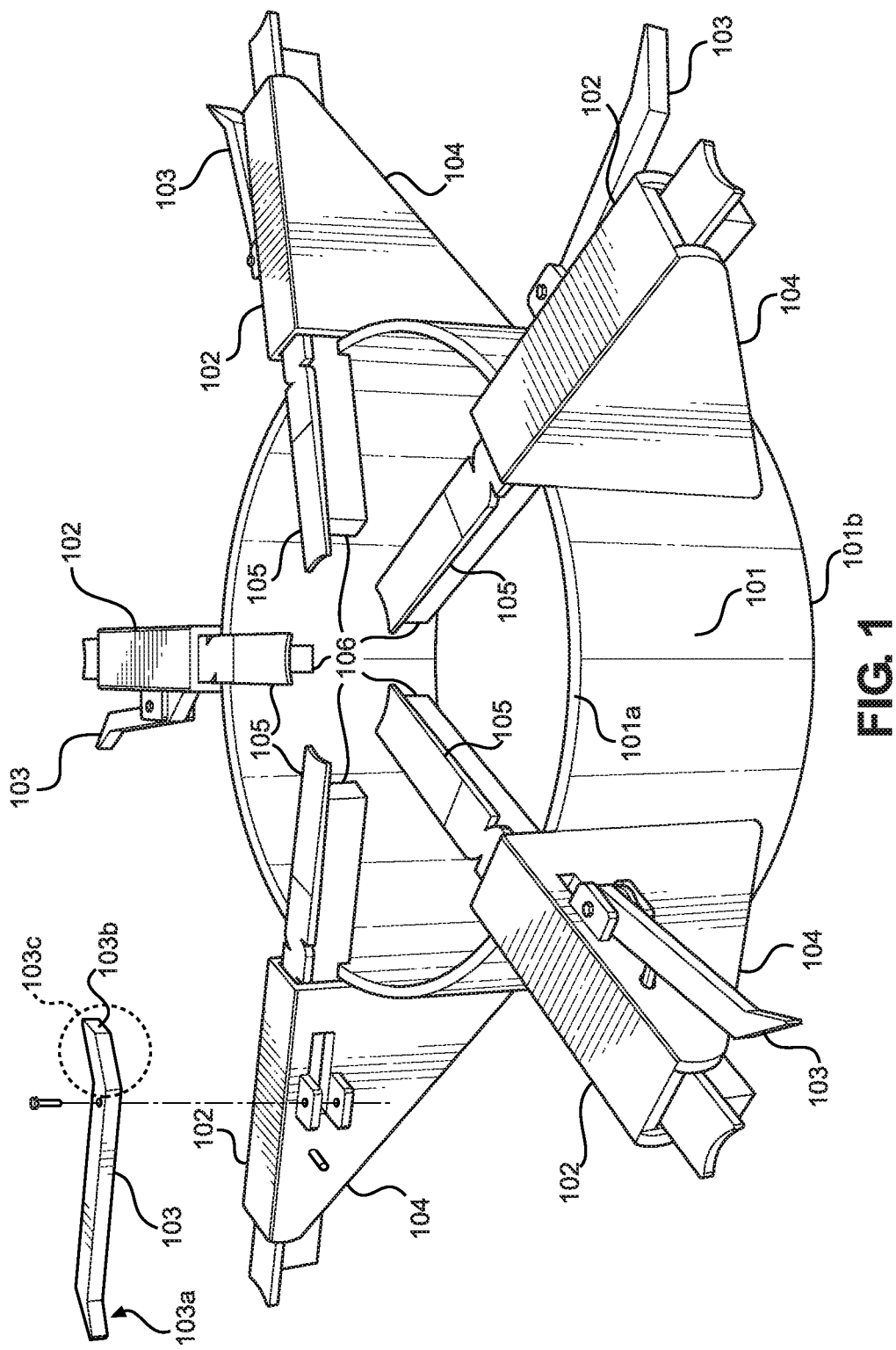
FIG. 1 shows a perspective view of an embodiment of the securement device for a press tool.

Reference is made herein to the attached drawings. Like reference numerals are used throughout the drawings to depict like or similar elements of the securement device for a press tool. For the purposes of presenting a brief and clear description of the present invention, a preferred embodiment will be discussed as used for the securement device for a press tool. The figures are intended for representative purposes only and should not be considered to be limiting in any respect.

Referring now to FIG. 1, there is shown a perspective view of an embodiment of the securement device for a press tool. The securement device for a press tool comprises an exterior body 101. In another embodiment, the exterior body 101 is rectangular. In this embodiment each side of the exterior body would have a ratcheting body 102 placed thereon. The exterior body 101 has a hollow middle section with an opening at both the top side 101a and the bottom side 101b. The exterior body 101 is made from a material that will not bend or break under pressures that are exerted from a standard pressing machine when the device is properly used. In one embodiment, the exterior body 101 is made from steel. In another embodiment, the exterior body 101 is made from iron.

The exterior body 101 has a plurality of ratcheting bodies 102 placed around the top side 101a. In one embodiment, the ratcheting bodies 102 are welded to the exterior body 101. In another embodiment, the ratcheting bodies 102 and the exterior body 101 are molded as one solid part. The ratcheting bodies 102 are attached perpendicular to the exterior body 101. In other embodiments, the ratcheting bodies 102 may be attached at angles that are not perpendicular so long as they are pointed over the top side 101a of the exterior body 101.

The ratcheting bodies 102 comprise an upper housing with an aperture therethrough that is also substantially perpendicular to the exterior body 101. The upper housing will allow a locking ratcheting bar 105 and a support ratchet bar 106 to be placed therein. The ratcheting bodies 102 further include a release handle 103 that will allow the locking ratcheting bar 105 to be moved as shown and described in FIG. 3 and FIG. 4. In some embodiments, the ratcheting bodies 102 will have additional support structures 104 attached thereto. The additional support structures 104 are placed below the ratcheting bodies 102 and attached to the underside of the ratcheting bodies 102 and to the exterior housing 101. This will help to hold the ratcheting bodies 102 in place when the press is activated.

Figure 2:
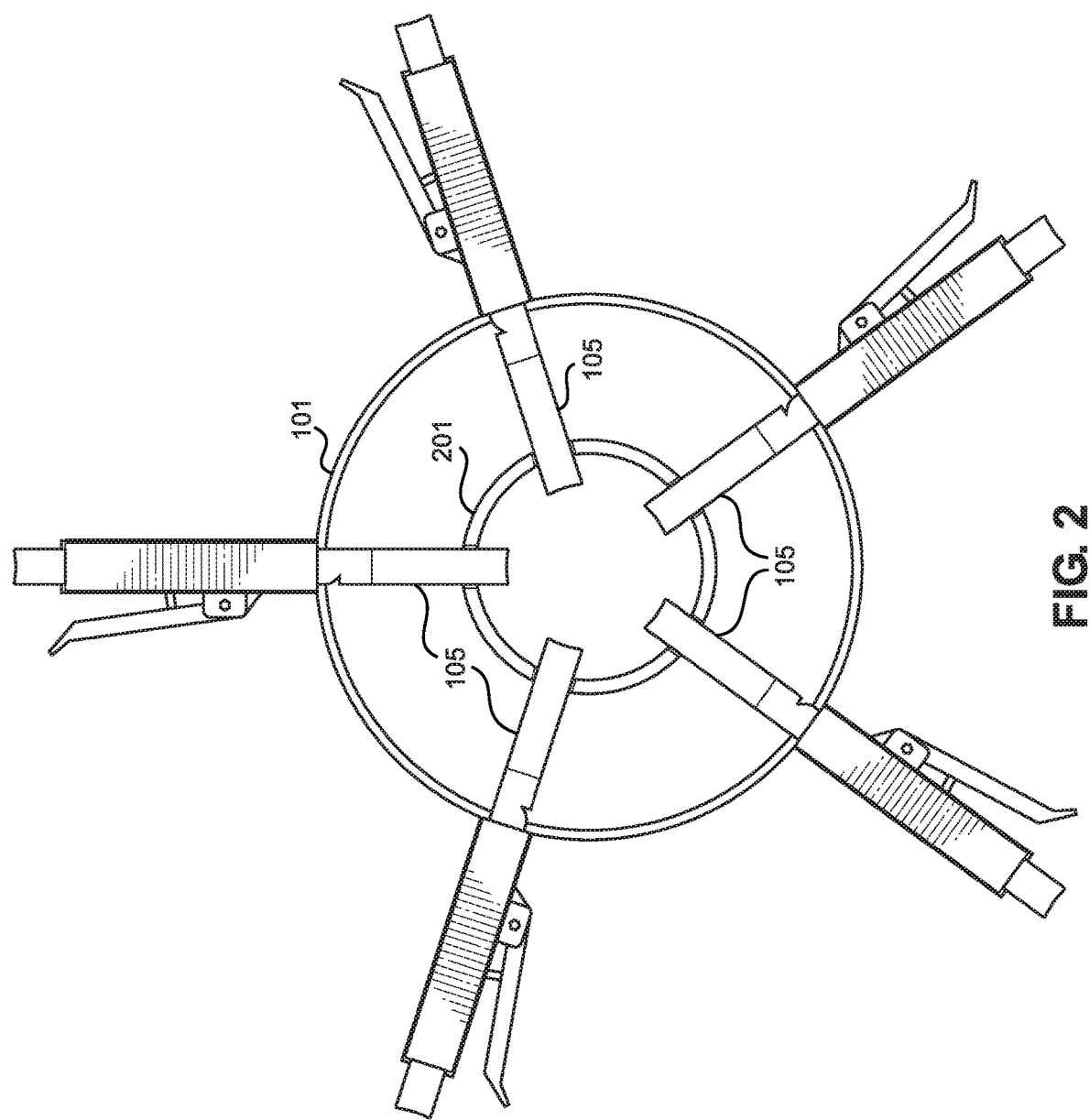
FIG. 2 shows a top down view of an embodiment of the securement device for a press tool.

Referring now to FIG. 2, there is shown a top down view of an embodiment of the securement device for a press tool. In some embodiments, the securement device for a press tool further includes an interior body 201. The interior body 201 is the same shape as the exterior body 101 but is dimensioned to fit within the exterior body 101. The interior body 201 should be the same height as the exterior body 101. This will allow the interior body to provide additional support. In one embodiment, the interior body 201 is attached to the exterior body 101. In another embodiment, the interior body 201 is only placed within the exterior body 101 but is freely movable therein.

The interior body 201 is further configured to support the ratchet support bar and the ratchet locking bar 105. In one embodiment, the interior body 201 will have channels about the top side to accept the rachet support bar and the ratchet locking bar 105. This will provide extra support to the ratchet bars when the device is in use holding an item to be pressed.

Figure 3:
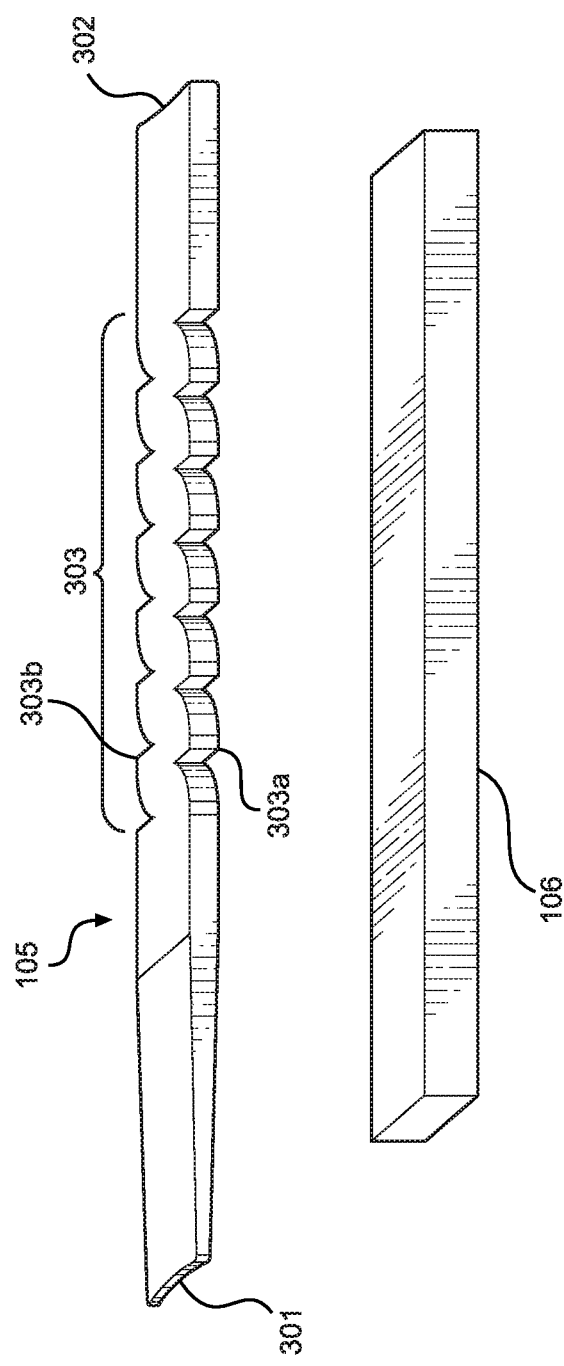
FIG. 3 shows a side perspective view of an embodiment of the ratchet bars for the securement device for a press tool.

Referring now to FIG. 3, there is shown a side perspective view of an embodiment of the inserts for the securement device for a press tool. The securement device for a press tool has a ratchet bar 105 that is placed within the ratcheting bodies. The ratchet bar has a first end 301 and a second end 302. In one embodiment, the ratcheting bar 105 tapers from the second end toward the first end. The tapering happens by thinning the height of the ratcheting bar 105. This will enable the bar to fit into smaller spaces. In one embodiment, the width of the ratcheting bar 105 stays the same for the length of the bar. In another embodiment, the width of the ratcheting bar 105 tapers as well. This tapering will allow the ratcheting bar 105 to fit into an item to be pressed.

The ratcheting bar 105 has a notched middle section 303. The notched middle section has a plurality of notches 303 along the length of the ratcheting bar 105. The notches are configured to allow an individual to press the ratcheting bar 105 forward toward the middle of the exterior body. The notches will then be engaged by the release handle, holding the ratcheting bar 105 in place. In other embodiments, the notches will be configured such that the release handle must be released to move the ratcheting bar 105 in either direction.

In some embodiments where the ratcheting bar 105 may be pressed inward without being released, there are different notches 303a, 303b. The notches are rounded in one direction and straight on the opposite direction. Referring to 303b the notch has a rounded end and a flat end. The rounded ends are pointed toward end 301 which will hold the item to be pressed in place. When the release handle as described below is engages the flat end will be used to lock the ratcheting bar 105 in place. This will allow the ratcheting bar 105 to be pressed in one direction and locked in another. The notches 303a, 303b will be configured in opposite directions. This will allow the ratcheting bar 105 to be placed in the ratcheting body in either direction. This means that either the first end 301 and the second end 302 can be placed into the ratcheting body and be used to hold an item to be pressed.

The securement device for a press tool comprises a support bar 106. In one embodiment, the support bar 106 has a rectangular cross section. In another embodiment, the support bar 106 has a circular cross section. The support bar 106 is designed to fit within the ratcheting bodies and support the ratcheting bar 105. The support bar 106 is configured to be thinner than the ratcheting bar 105 such that the support bar 106 is optional and the ratcheting bar 105 will still be supported by the ratcheting bodies. The support bar 106 is capable of being moved independently from the ratchet bar.

Figure 4:
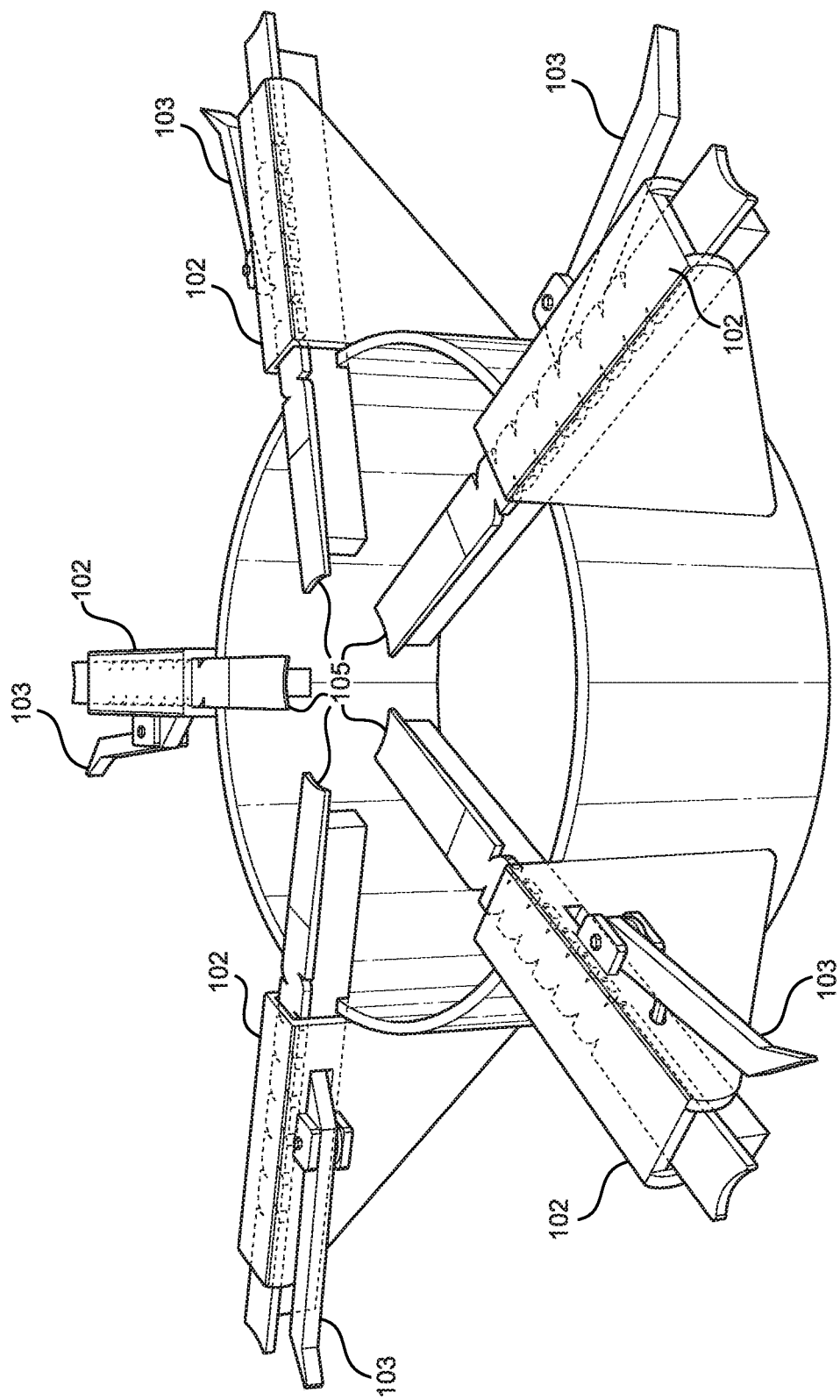
FIG. 4 shows a perspective view of an embodiment of the ratchet bars within the securement device for a press tool.

Referring now to FIG. 4, there is shown a perspective view of an embodiment of the inserts within the securement device for a press tool. The ratcheting bar 105 and the support bar are placed within the ratcheting bodies 102. The release handles 103 are configured to engage with the ratcheting bar 105. The support bar can be moved into a proper position. This will allow an item to be pressed to be supported by the plurality of ratcheting bars 105. The release handles 103 as shown in FIG. 1 have an engagement section 103c and an expanded end 103a. The expanded end will ensure that a user's hand does not slip from the release handle 103. The engagement section 103c has a flat engagement end 103b. The flat engagement end is configured to mesh with the flat end of the notches on the ratcheting bars. The engagement section will engage the notches and hold the ratcheting bars 105 in place.

Figure 5:
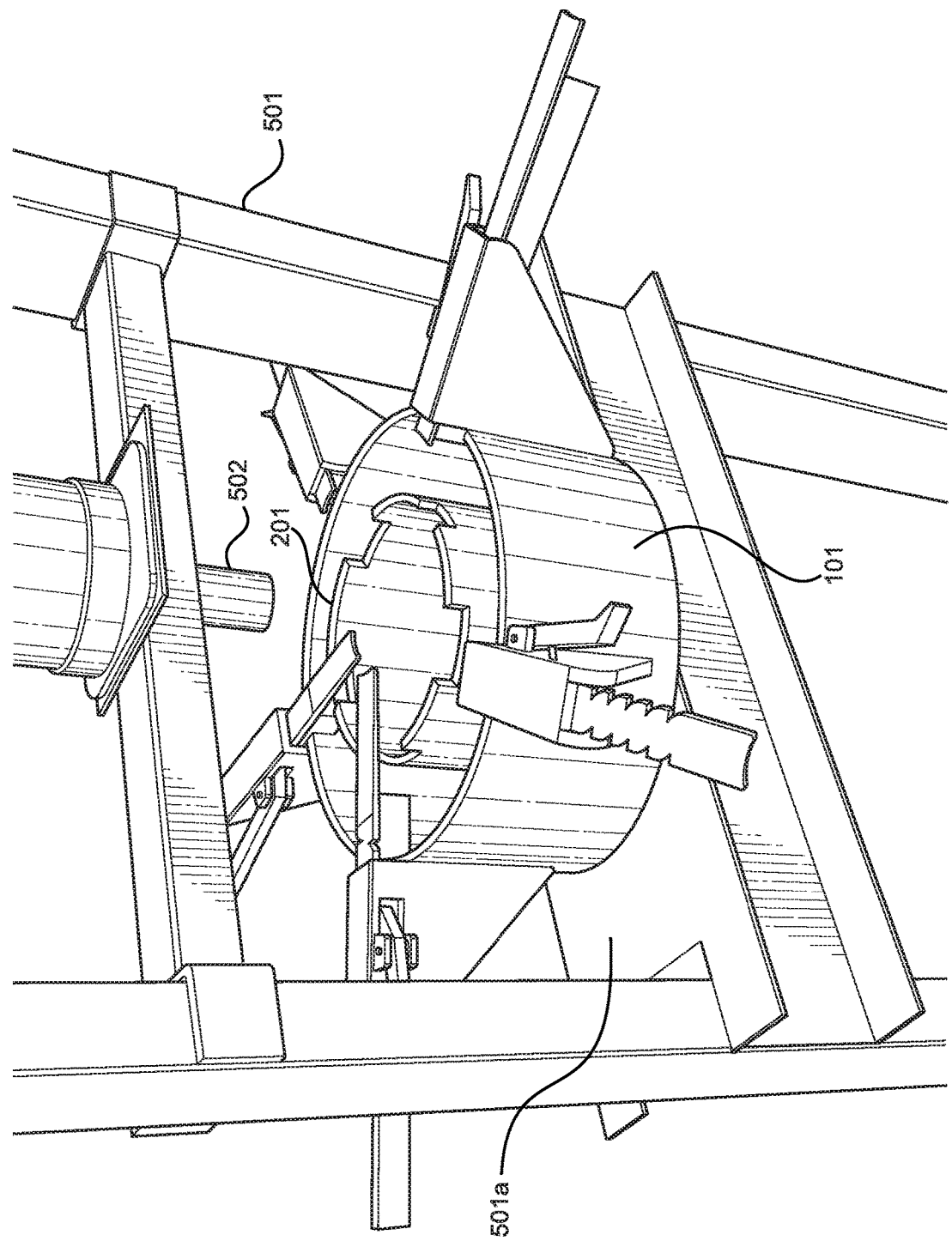
FIG. 5 shows a perspective view of an embodiment of the device on a press tool.

Referring now to FIG. 5, there is shown a perspective view of an embodiment of the device on a press tool. In use, the securement device for a press tool will be placed on a press tool 501. The device will be placed on the press bench 501a. In this embodiment there is shown the interior body 201 placed on the bench within the exterior body 101. The press bench 501a is capable of supporting both bodies. The device can then have an item to be pressed secured within the ratcheting bars and the support bars. This will allow the press bar 502 to press the item and for the press bar to move into the device is needed.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A securement device for a press tool, the securement device comprising:
   an exterior body having at least one sidewall;
   wherein an opening is disposed through a top and a bottom of the exterior body;
   a plurality of ratcheting bodies disposed around a top side of the sidewall;
   wherein the ratcheting bodies are disposed on a plane perpendicular to the plane of the sidewall;
   wherein each of the ratcheting bodies comprises a support structure on a bottom surface thereof, the support structure extending outward from an external surface of the sidewall of the exterior body; the securement device further comprising a respective release handle attached to each of the ratcheting bodies.

2. The securement device of claim 1, wherein the exterior body is cylindrical.

3. The securement device of claim 1, wherein each of the ratcheting bodies comprises a ratchet bar;
   wherein the ratchet bar is configured to slide forward toward the middle of the exterior body and is further configured to lock in a desired position by the ratcheting body.

4. The securement device of claim 3, further comprising a support bar located below the ratchet bar.

5. The securement device of claim 3, wherein the ratchet bar has a first end and a second end;
   wherein a plurality of ratchet notches are disposed on the ratchet bar between the first end and the second end.

6. The securement device of claim 5, wherein the ratchet bar tapers toward the first end.

7. The securement device of claim 5, wherein the ratchet bar is reversable.

8. A securement device for a press tool, the securement device comprising:
   an exterior body having at least one sidewall;
   wherein an opening is disposed through a top and a bottom of the exterior body;
   a plurality of ratcheting bodies disposed around a top side of the sidewall;
   wherein the ratcheting bodies are disposed on a plane perpendicular to the plane of the sidewall;
   an interior body having at least one sidewall, wherein the interior body is movably disposed within the exterior body;
   wherein the interior body allows the ratcheting bodies to rest about a top edge of the interior body; wherein each of the ratcheting bodies comprises a support structure on a bottom surface thereof, the support structure extending outward from an external surface of the sidewall of the exterior body; the securement device further comprising a respective release handle attached to each of the ratcheting bodies.

9. The securement device of claim 8, wherein the exterior body is angular.

10. The securement device of claim 8, wherein each of the ratcheting bodies comprises a ratchet bar;
    wherein the ratchet bar is configured to slide forward toward the middle of the exterior body and is further configured to lock in a desired position by the ratcheting body.

11. The securement device of claim 10, further comprising a support bar located below the ratchet bar.

12. The securement device of claim 10, wherein the ratchet bar has a first end and a second end;
    wherein a plurality of ratchet notches placed on the ratchet bar between the first and the second end.

13. The securement device of claim 12, wherein the ratchet bar tapers toward the first end.

14. The securement device of claim 12, wherein the ratchet bar is reversable.

15. The securement device of claim 8, wherein there are grooves placed in the top edge of the interior body that correspond with the ratcheting bodies.

16. The securement device of claim 8, wherein the interior body is the same relative shape as the exterior body.

* * * * *